(12) United States Patent  (10) Patent No.: US 8,235,335 B2
Sato et al.                      (45) Date of Patent: Aug. 7, 2012

(54) MULTI-DISPLAY DEVICE

(76) Inventors: Norikazu Sato, Tokyo (JP); Osamu Ikeda, Uchikoshi-machi (JP)

( * ) Notice: Subject to any disclaimer, the term of this patent is extended or adjusted under 35 U.S.C. 154(b) by 258 days.

(21) Appl. No.: 10/505,408

(22) PCT Filed: Jun. 28, 2002

(86) PCT No.: PCT/JP02/06545
§ 371 (c)(1),
(2), (4) Date: Oct. 16, 2006

(87) PCT Pub. No.: WO03/073402
PCT Pub. Date: Sep. 4, 2003

(65) Prior Publication Data
US 2006/0232496 A1    Oct. 19, 2006

(30) Foreign Application Priority Data
Feb. 26, 2002  (JP) .................... 2002-100642

(51) Int. Cl.
*F16M 11/04* (2006.01)
(52) U.S. Cl. ............ 248/176.3; 248/919; 248/922; 16/367
(58) Field of Classification Search ............ 248/176.3, 248/676, 917, 919–924; 361/681–683; 16/367; 345/1.1, 9; 348/E9.012; 40/605, 610
See application file for complete search history.

(56) References Cited

U.S. PATENT DOCUMENTS

| | | | | |
|---|---|---|---|---|
| 4,233,708 A | * | 11/1980 | Bonar | 16/309 |
| 5,128,662 A | * | 7/1992 | Failla | 345/1.3 |
| 5,416,666 A | * | 5/1995 | Maguire, Jr. | 361/681 |
| 5,592,717 A | * | 1/1997 | Longo | 16/367 |
| 6,222,507 B1 | * | 4/2001 | Gouko | 345/1.1 |
| 6,302,612 B1 | * | 10/2001 | Fowler et al. | 403/76 |
| 6,339,410 B1 | * | 1/2002 | Milner et al. | 345/1.1 |
| 6,343,006 B1 | * | 1/2002 | Moscovitch et al. | 361/681 |
| 6,967,632 B1 | * | 11/2005 | Minami et al. | 345/1.3 |

FOREIGN PATENT DOCUMENTS

JP    2001-228810 A  *  8/2001

* cited by examiner

*Primary Examiner* — Korie H. Chan

(57) ABSTRACT

There is provided a multi-display device capable of displaying the entity of an image even in a case of a large image to be displayed, and capable of changing a horizontally long image screen to a vertically long image screenor vice versa by utilizing no mechanism for rotating, by 90 degrees, a display section and any specific soft therefor. For this purpose, the multi-display device is characterized by arranging a plurality of basic displays each having a function as a display in at least either one of vertical direction and horizontal direction.

2 Claims, 13 Drawing Sheets

MULTI-DISPLAY DEVICE

TECHNICAL FIELD

The present invention relates to a display device constituting a computer system, for example, and more specifically, a multi-display device capable of displaying a large image and also displaying a plurality of images.

BACKGROUND ART

In recent years, with remarkable improvement of computers or computer systems including display devices, it is required to make large an image display screen and display a plurality of images at the same time as functions required for such computers or computer systems.

For example, in a CAD or CAM device, since a machine assembling diagram to be described occupies a wide area, it is necessary to use a display device having a high resolution and a large image display screen.

However, since a display device, having high resolution, which has been generally utilized, has a size of 23 inches in the largest size, there is a case that whole of the machine assembling diagram and the like cannot be displayed on one screen surface. As a result, in such case, a mechanical designer operates the device to display such a machine assembling diagram merely by partially displaying a part thereof and then modifies or amends it, thus being troublesome for the designer.

Furthermore, in a computer utilized for an office work, there is a case that a document is prepared with reference to a preliminarily prepared list or list table. In such case, for example, the screen of the display device is divided into two sections so that the above-mentioned list table is displayed on one divided screen section, and then, a document is prepared on the other divided screen section by starting up and driving a word processor software. In the case of utilizing this device, however, the display screen of the display device is divided into two sections, so that the respective screen sections have small areas, and for example, there may cause a case that the list table cannot be entirely displayed, leading to failure of smoothly preparing the document, which is a new problem.

Incidentally, it is conventional technology to arrange a plurality of display devices or units side by side to thereby display one image by whole of them or a plurality of images individually. In such arrangement of the display devices, the respective display devices, each supported by a support stand, are merely arranged on a desk horizontally or vertically, or the respective display devices, which are supported by arms, are arranged horizontally or vertically.

However, these arrangements provide the following problems. That is, in each arrangement, since the individual display device has an outer frame having a wide width, a large distance is present between the screens of the adjacent display devices, and accordingly, as the screen size becomes large, it is difficult for a viewer to clearly observe the screen.

In addition, it is required to prepare the support stands or supporting arms of the numbers same as the numbers of the display devices, requiring much space for arrangement. Especially, in the case of using the supporting arms, it is further required to locate a support member such as stand or wall to which the arms are secured, leading to an enlargement of the equipment, involving much cost, and troublesome working will be needed for transferring these arms, members and devices.

Still furthermore, in a certain case, according to an image to be displayed, a display device having a vertically large screen may be usable more than a display device having a horizontally large screen as conventional. In such case, in the conventional technology, the screen of the display device is rotated by 90 degrees, which requires an additional device or equipment to rotate the screen and a specific software therefore, involving additional cost.

DISCLOSURE OF THE INVENTION

The present invention has therefore an object to provide a multi-display device capable of entirely displaying even a large image, capable of simultaneously displaying a plurality of images and displaying an image on a horizontally large screen or a vertically large screen on a screen without using a mechanism for rotating, by 90 degrees, the display section or specific soft therefor.

One embodiment of the multi-display device according to the present invention is characterized by an arrangement in which a plurality of basic displays each having a function as a display are arranged in at least either one of vertical direction and horizontal direction. In this embodiment, the basic display includes an image display section and a support frame surrounding the image display section.

Further, in this arrangement, it is characterized that a plurality of basic units each including a plurality of basic displays adjacently arranged in at least either one of vertical direction and horizontal direction are arranged in at least either one of vertical direction and horizontal direction.

For example, in a case of adopting a basic unit including a vertically arranged two basic displays, a portable multi-display device including two such basic units arranged horizontally includes four display screens of vertical two screens and horizontal two screens can be realized with a small location space.

According to this structure, one large image can be displayed on the four image screens, and four images can be displayed on these four screens, respectively, thus being suitable for working performed with reference to the respective image screens. Moreover, a vertically long image or horizontally long image can be displayed without utilizing any mechanism for rotating, by 90 degrees, the display screen or any specific soft therefor.

In addition, the basic unit is suitable for a wide use by increasing the number of the basic unit to be located. In an Internet ages, by utilizing such basic units, a vertically long image can be displayed in one view without scrolling the image screen, thus achieving an advantageous merit.

Furthermore, in the present invention, it is further characterized that a plurality of basic displays are assembled in one outer frame.

According to this structure, the distance between the adjacent image screens can be minimized, thus making light the weight of the device.

Furthermore, in the present invention, it is also characterized that the basic displays or basic units which are adjacently arranged are connected to each other in a manner that side portions of the basic displays or basic units opposing to each other or portions fixed to the side portions are connected through a connection mechanism.

According to this structure, by connecting the basic displays or basic units adjacent to each other, the screens can be clearly observed by a user and, in addition, the multi-display device can be located in a narrow space.

Furthermore, in the present invention, it is characterized that an angle constituted by the basic displays or basic units arranged adjacently to each other is adjustable to an optional angle.

According to this structure, the image screens can be clearly observed by a user.

Furthermore, in the present invention, it is also characterized that a plurality of basic displays or basic units are horizontally arranged, and lateral basic displays or lateral basic units are connected to the central basic display or central basic unit respectively by a connection mechanism, and in this case, a distance between the adjacent basic displays at an upper side portion of the basic display or basic unit is different from one at a lower side portion thereof.

According to this structure, even in a case where, in order to easily observe the displayed image entirely by the multi-display device, the central basic display or central basic unit is inclined vertically so that the upper side portion of the image screen is apart from the user, and the right and left (i.e., lateral) image screens adjacent to the inclined central image screen is inclined forward (towards the user) with respect to the central image screen, the image screens can be clearly observed even in the inclination of the lower end portion of the lateral (right and left) basic display or basic unit.

Furthermore, in the present invention, it is characterized that an upper side connection portion and a lower side connection portion connecting the basic displays or basic units adjacent to each other are composed in one integrated member.

In addition, in the present invention, it is characterized that the basic display is held and supported in an inclined state by an additionally disposed inclination mechanism.

According to such structures, the user can more clearly observe the displayed image screen.

BEST MODE FOR EMBODYING THE INVENTION

Embodiments of the present invention will be described hereunder with reference to the accompanying drawings.

Figure 1:
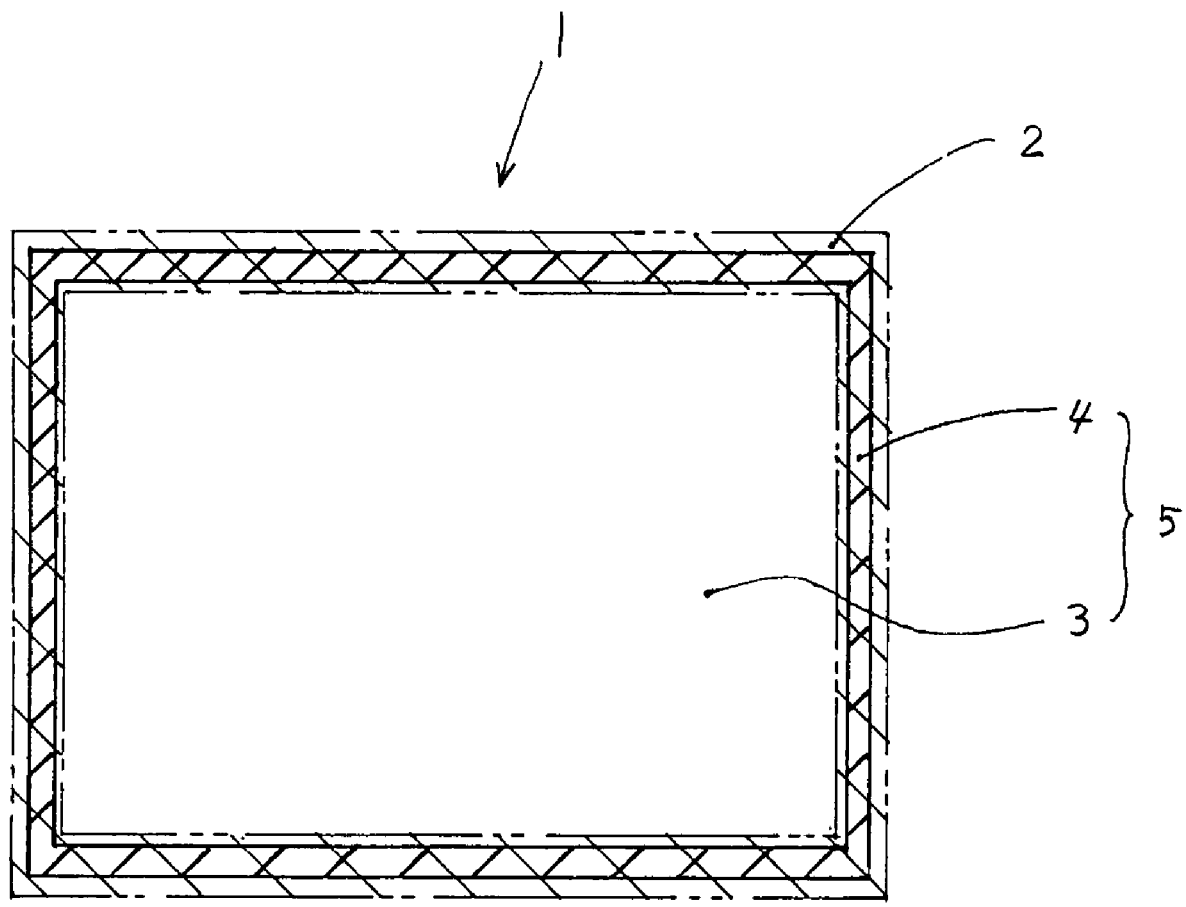
FIG. 1 is a view explaining a basic display concerning the present invention.

FIG. 1 is a view explaining a basic display according to the present invention, in which a portion shown by oblique lines descending rightward designates a usual outer frame 2 of a commercially sold display device 1, and a portion inside the outer frame 2 shown by oblique lines descending leftward designates an image display section support frame 4 as a support frame surrounding an image display section 3. Herein, the image display section 3 and the image display section support frame 4 constitute a basic display 5.

Figure 2:
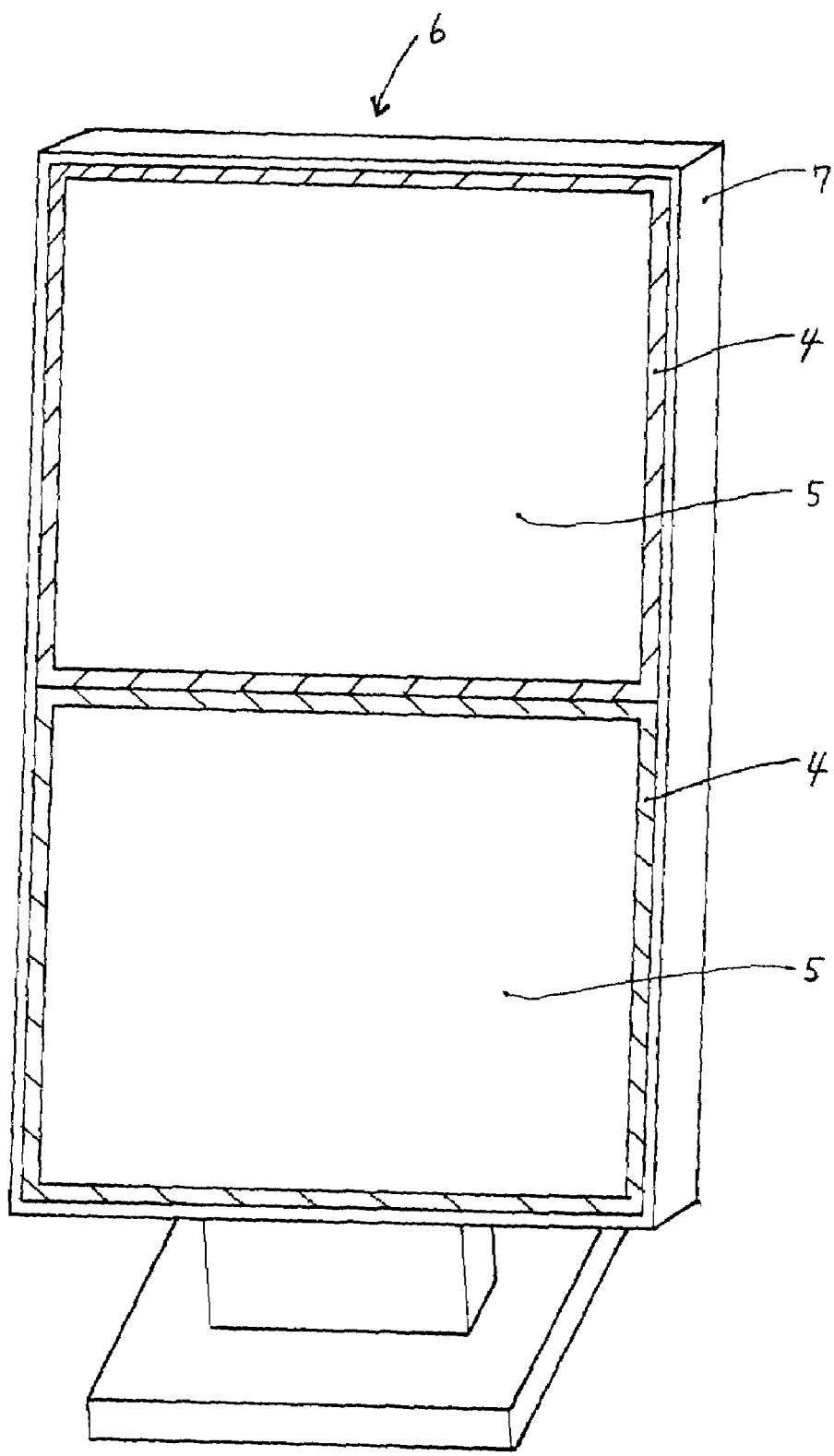
FIG. 2 is a schematic perspective view showing a basic unit according to a first embodiment of a multi-display device of the present invention.
Figure 3:
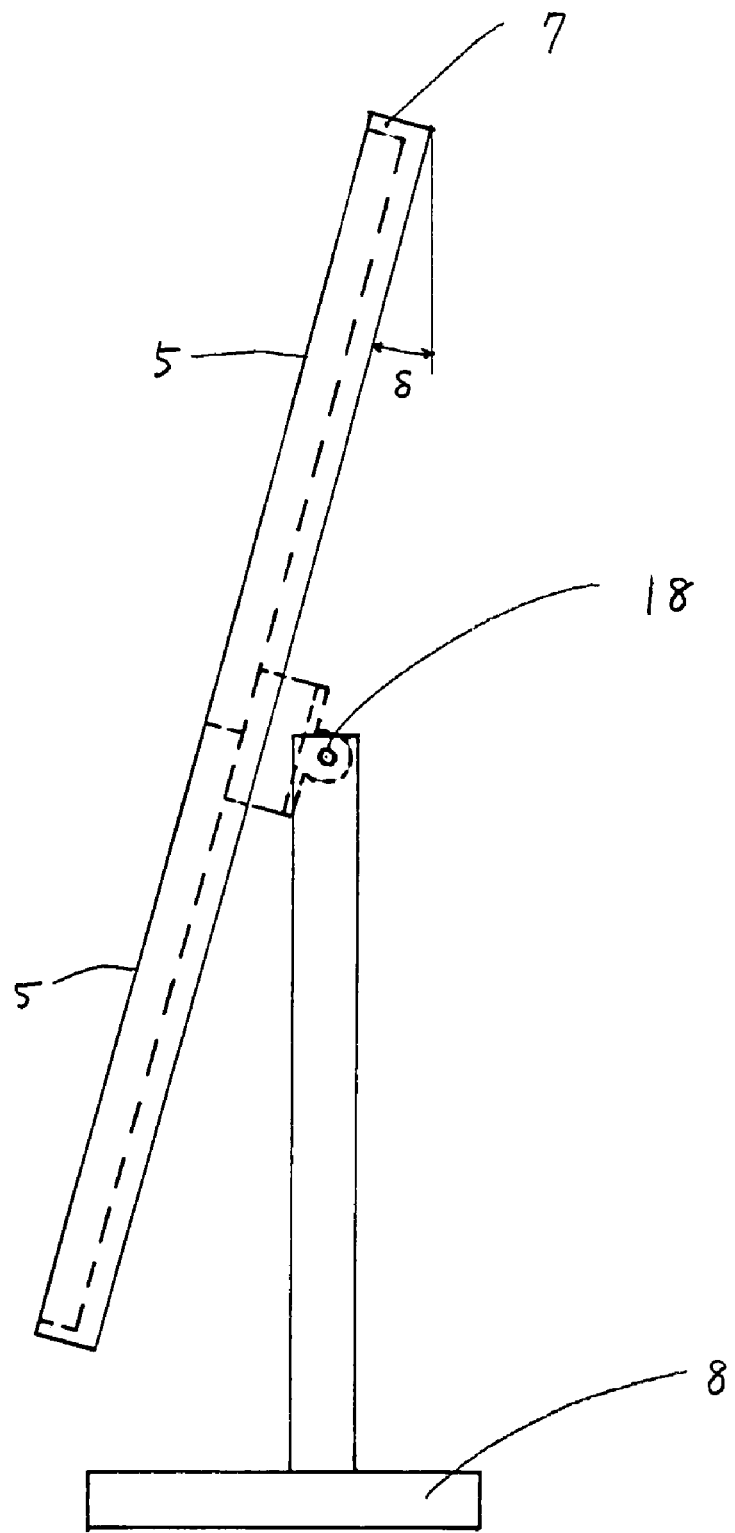
FIG. 3 is a side view of the above-mentioned first embodiment specifically showing an example of an additional inclination mechanism.

FIGS. 2 and 3 represent the first embodiment of the present invention, in which FIG. 2 is a schematic perspective view of a basic unit 6 having two basic displays (liquid crystal displays) 5, 5 vertically arranged and one outer frame 7 holding such vertical two basic displays 5, 5. Referring to FIG. 2, a portion, inside the outer frame 7, shown by the oblique lines designates the image display section support frame 4. Further, it is to be noted that this image display section support frame 4 may be eliminated in the subsequent drawings for the sake of clear understanding of the present invention.

The outer frame 7, mentioned herein, is a frame member holding a plurality of basic displays 5 and is not mere a frame generally having a box-shape, for example, and surrounding a certain area by its four or five inside surfaces.

FIG. 3 is a side view of FIG. 2 showing a state that the basic unit 6 is supported by an inclination mechanism 18 (i.e., tilt mechanism) provided on an upper side portion of a support stand 8 at a tilt angle δ (vertically inclining angle or inclination angle in a vertical plane as viewed), which is changeable.

The basic unit 6 of this first embodiment includes two basic displays 5, 5 which are generally connected together in series without utilizing any outer frame 2, so that a compact display device can be provided as far as it includes two display sections. Moreover, this basic unit 6 has a portable structure capable of being moved on a desk or like, thus providing a new type display device over prior art type.

Furthermore, according to this first embodiment, a boundary portion between the vertically arranged two basic displays 5, 5 can be formed in a more fine shape, which contributes to improved continuity of the vertical two display sections, saves a material for manufacturing the outer frame 7 and realizes a light weight structure. In addition, in a conventional technology, two display devices 1 are arranged side by side for displaying respective halves of a vertically long image side by side, but by using the basic unit 6 of this invention, the vertically long image can be displayed as a vertical list. Thus, effective working can be realized. In addition, the displayed screen can be held and maintained at a suitable inclination by utilizing the additionally mounted inclination mechanism 18, and therefore, the inclined vertical screens can be easily visible for a user.

Figure 4:
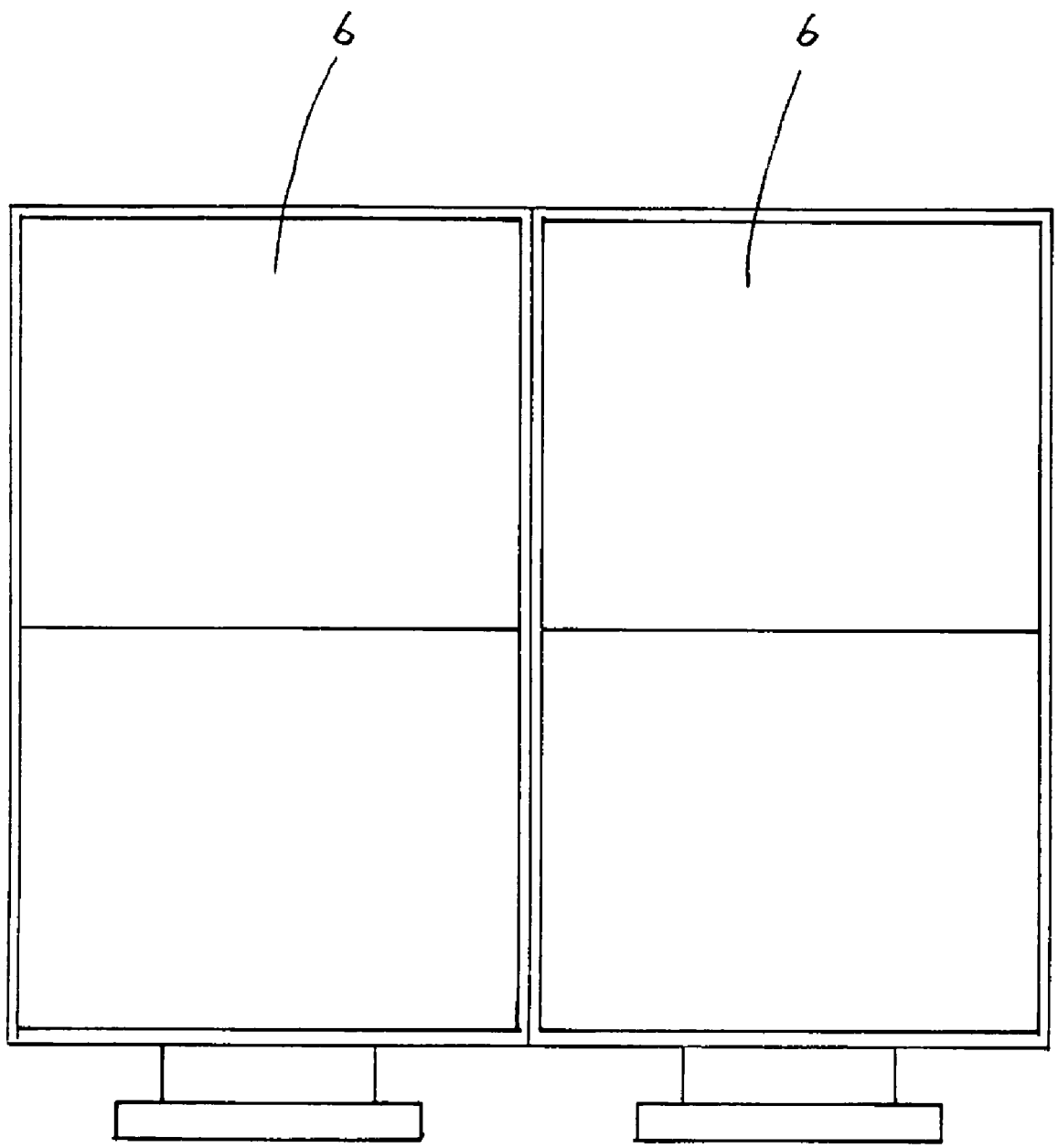
FIG. 4 is a front view showing a second embodiment of the present invention, which is constituted by arranging horizontally two basic units, each being the first embodiment shown in FIG. 1.

FIG. 4 represents the second embodiment of the present invention of a multi-display device, having space-saving structure, in which the two basic units 6 are horizontally arranged so as to provide four screen sections including two sections vertically and two sections horizontally.

According to this second embodiment, a multi-monitoring operation will be performed by installing a graphic board for multi-screen and a driversoftware therefor into a computer. That is, accordingly, one large image can be displayed on the four display screens, and moreover, the lower two screens may be utilized for an ordinary working and the upper two screens may be utilized for reference, thus improving the working efficiency.

Still furthermore, the vertically or laterally long sized image can be entirely displayed without using an additional mechanism for rotating the display section by, for example 90 degrees, and a specific soft therefor. In addition, a wide multi-display device including more display screens can be provided by utilizing a number of basic units 6, providing possibility of further wide display screen.

Figure 5:
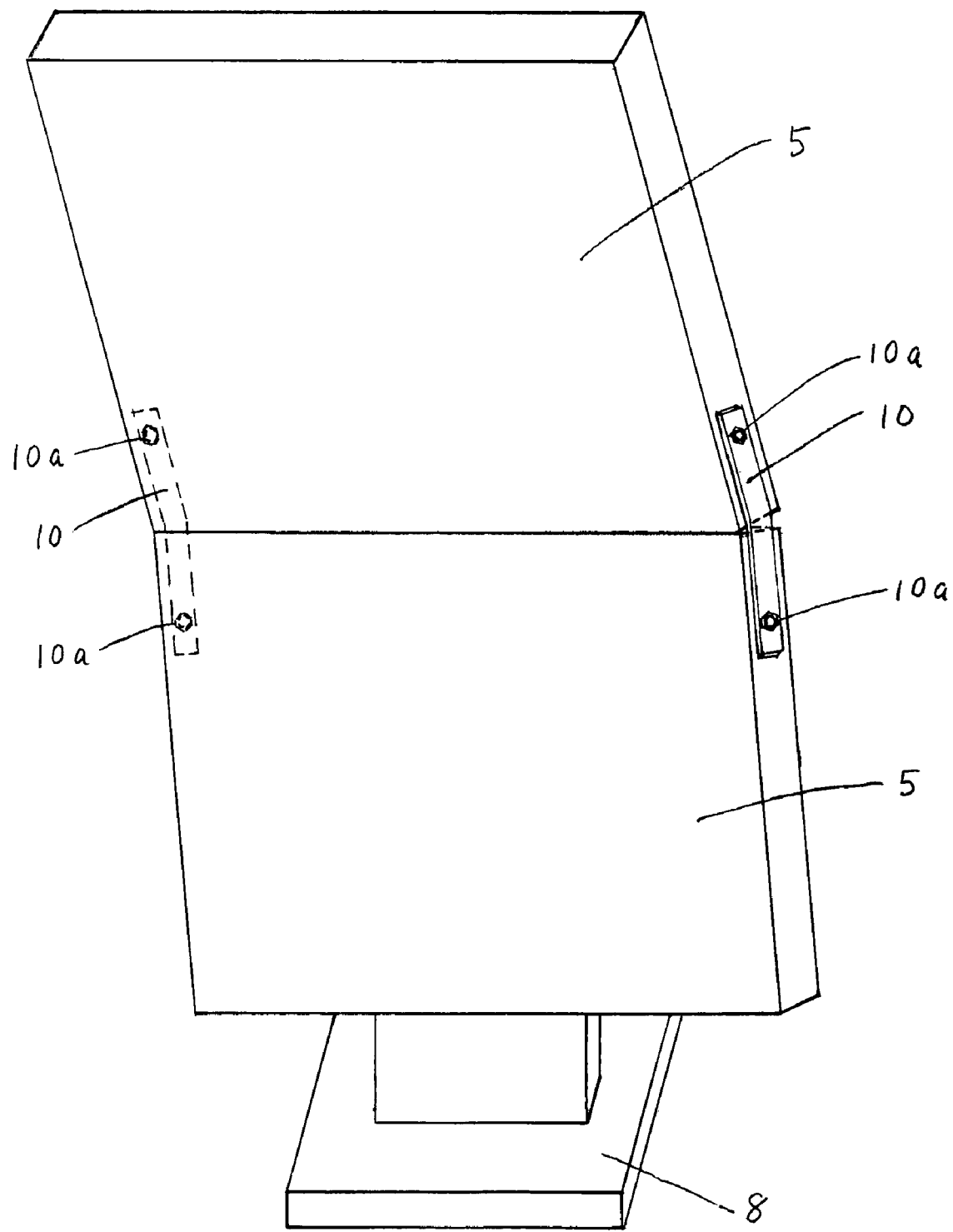
FIG. 5 is a perspective view showing a third embodiment of the present invention, in which one basic display is disposed on another one basic display in a manner fixed by using a stationary connection mechanism (fixing block and screw are utilized as the connection members) so as to constitute an angle in a vertical plane.

FIG. 5 represents the third embodiment, which shows a multi-display device including one basic display 5 inclined in a vertical plane and mounted on another one basic display 5 supported by the support stand 8 and connected thereto by using a fixing block 10 as connection member. That is, in this structure, the upper side display screen is inclined at a predetermined stationary angle with respect to the lower side screen so as to easily observe the image. Further, in this structure, the vertical basic displays 5, 5 are connected, at their side portions, to the fixing block 10 by suitable means, which are known means such as fastening screws 10a, for example. Further, in this illustrated embodiment, although the side portions of the basic displays 5, 5 are connected to the fixing block 10 directly by the fastening screws 10a, they may be connected to the stationary block 10 by interposing a plate member fastened to the side portions by screws.

Figure 6:
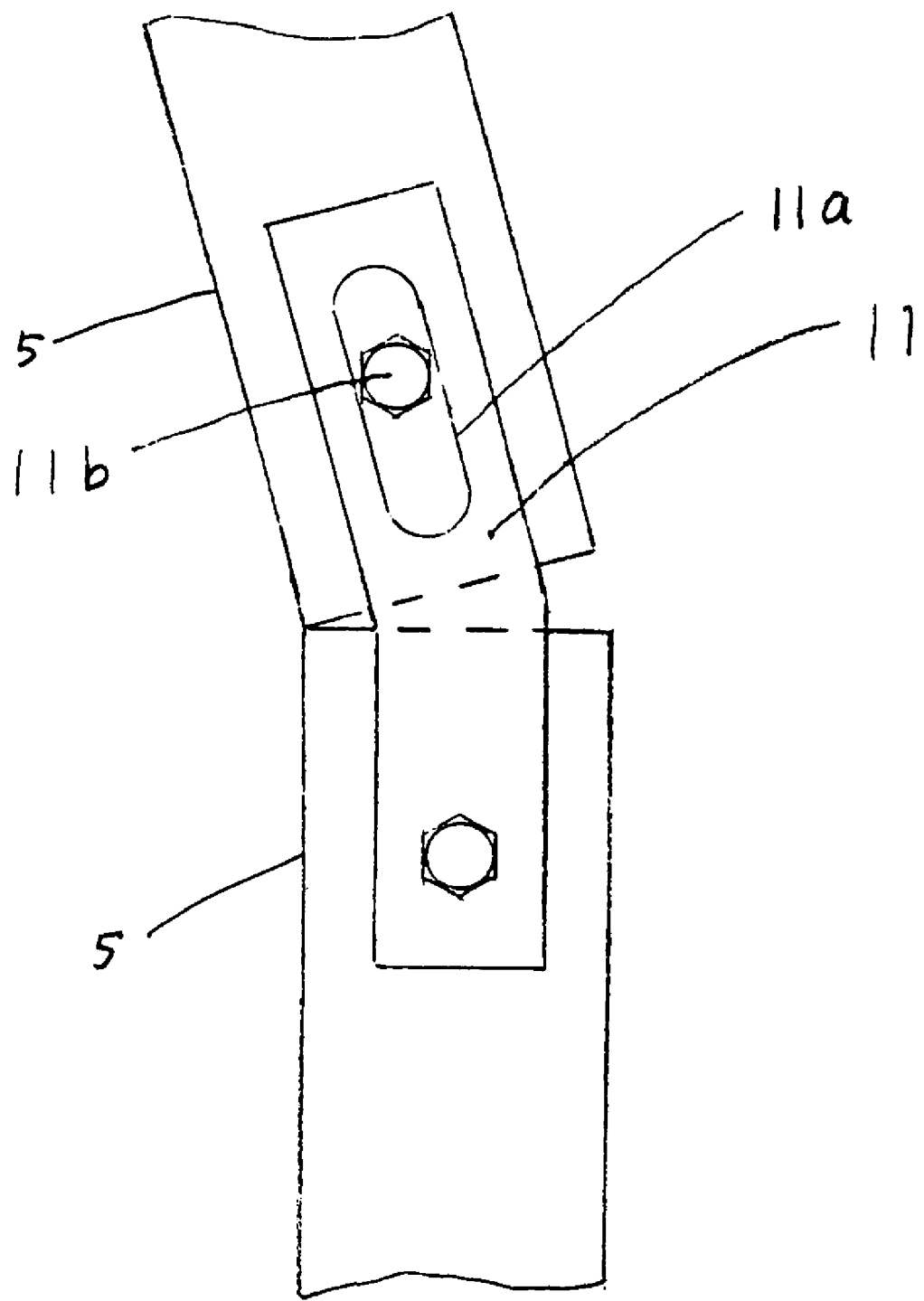
FIG. 6 is a side view of a modified embodiment of the third embodiment, in which one basic display is disposed on another one basic display to be movable by using a movable connection mechanism (a block member having a slot and a fastening screw engaged with this slot are utilized as the connection members) so that the basic displays are arranged to be adjustable in the relative position between these basic displays.

FIG. 6 is the side view of the modification of the third embodiment, having a structure in which one basic display 5 mounted on another one basic display 5 is connected by using a movable connection mechanism (including a block member 11 having a slot 11a and a fastening screw slidably engaged with this slot 11a) so that the position of the upper side basic display 5 is adjustable with respect to the lower side basic display 5.

As such a connection mechanism, in an alternation, an assembly of a block member having a number of holes and fastening screws may be adopted.

Figure 7:
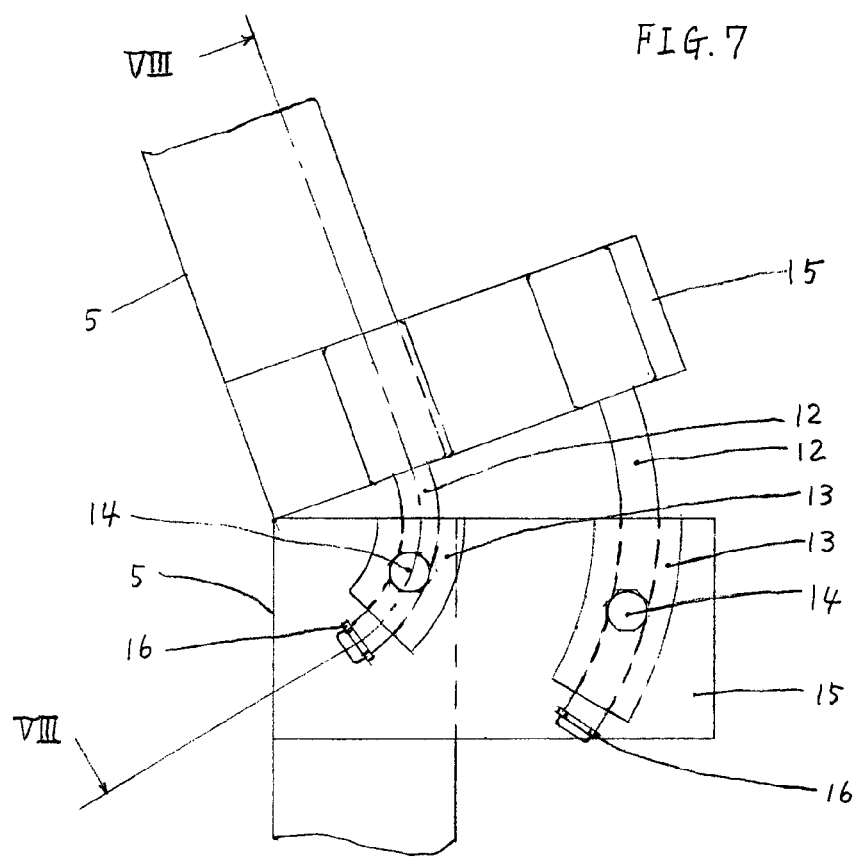
FIGS. 7 and 8 are side view of a fourth embodiment of the present invention and a sectional view thereof taken along the line VIII-VIII, respectively, in which an angle constituted by the basic displays arranged vertically is adjustable by using a connection member including a circular-arc rail and a guide.
Figure 8:
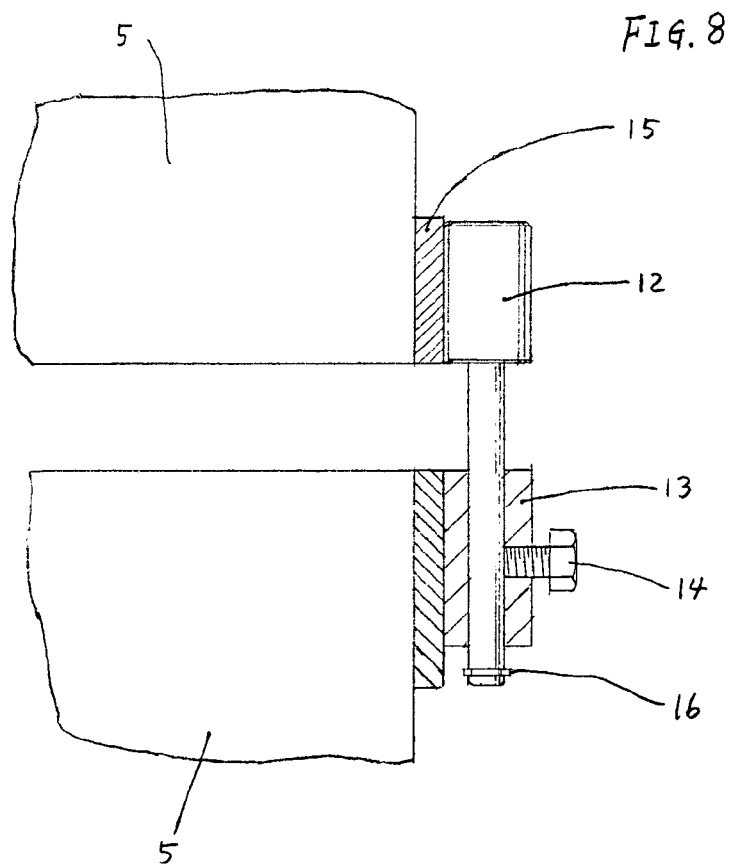

FIGS. 7 and 8 represent the fourth embodiment having a structure in which the connection mechanism comprises two pair of assemblies each composed of a circular-arc rail 12 and a guide 13 to which the rail 12 is fitted to be slidable. One end of the rail 12 is welded or fixed, by means of fixing screw, to a side plate 15 of one of the basic displays 5, 5, and on the other hand, the guide 13 is welded or fixed, by means of fixing screw, to the other one of the basic displays 5, 5. When the rails 12 are vertically moved with respect to the guides 13, the angle of the upper side screen with respect to the lower side screen is changed. In order to fix the upper side screen at an angle easily visible for a user, the rails 12 are fastened by means of set bolts 14 mounted to the guides 13. Furthermore, in order to prevent the rail 12 from coming off from the guide 13, a stop ring 16 may be fitted to the other one end of the rail 12.

Further, in an alternation, there may be provided a structure in which the rail 12 is formed with a plurality of grooves and the guide 13 is formed with slide pins which are fitted to these grooves so that the position of the groove, with which the slide pins are engaged, are changed to thereby change the inclination angle stepwise.

Figure 9:
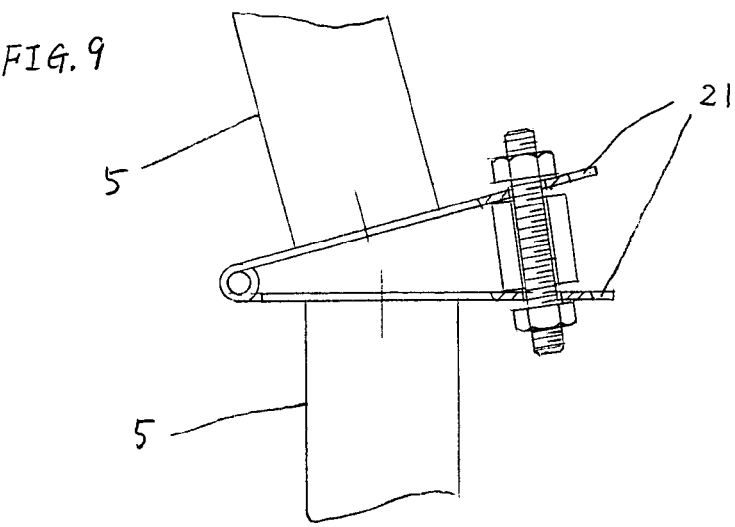
FIGS. 9 and 10 are a side view and a partially enlarged side view of a fifth embodiment of the present invention, which is provided with a connection mechanism comprising a hinge member having an inclination (angle) adjusting mechanism capable of adjusting an inclination in a vertical plane for adjusting an angle constituted by both the vertically arranged basic displays and supporting the same.
Figure 10:
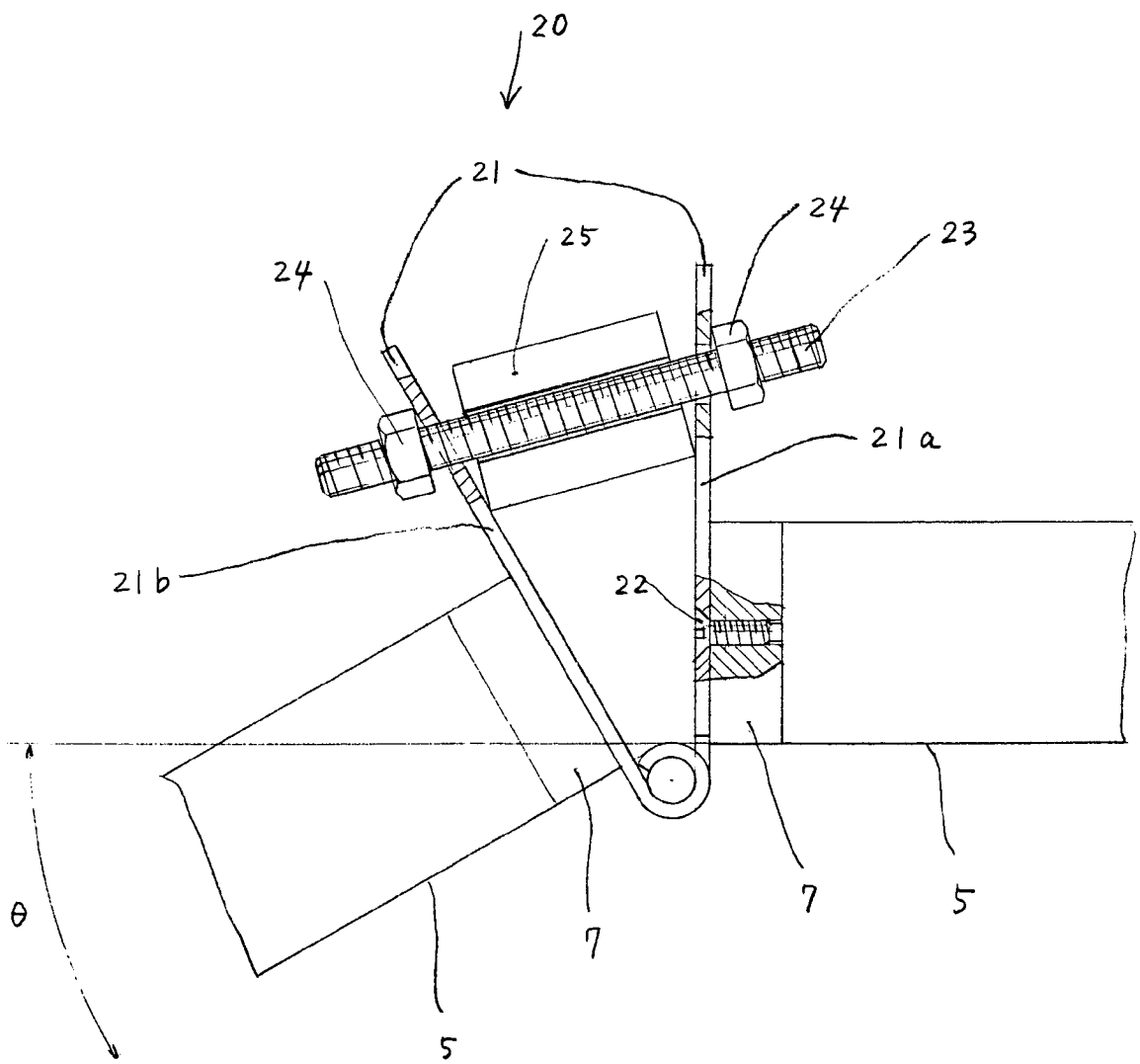

FIGS. 9 and 10 represent the fifth embodiment of the present invention, which are right side view and enlarged view of its essential portion, showing one example in which a specific hinge member 21 connecting both the basic displays 5, 5 is utilized as connection mechanism. FIG. 10 shows an inclination (angle) adjusting mechanism 20 which can adjust and hold an angle θ constituted by the display screens of the vertical two basic displays 5, 5 to an optional angle in a predetermined range by adjusting and fixing an opening angle of the hinge member 21.

Referring to FIG. 10, a connection half 21a of the specific hinge member 21 is connected to the side surface (top surface) of the lower side basic display 5 by suitable means such as screw 22, and on the other hand, the other connection half 21b of the specific hinge member 21 is also connected to the side surface (bottom surface) of the upper side basic display 5 by suitable means such as screw 22. These connection halves 21a and 21b are formed with holes other than screw holes and a screw shaft 23 is penetrated therethrough and both end portions of the penetrated screw shaft 23 are screwed with nuts 24, 24, respectively. Thus, the inclination angle θ, in the perpendicular plane, of the upper side basic display 5 with respect to the lower side basic display 5 can be adjusted. Further, in FIG. 10, reference numeral 25 denotes a collar in form of pipe, and this and above-mentioned members constitute the inclination angle adjusting mechanism 20.

Figure 11:
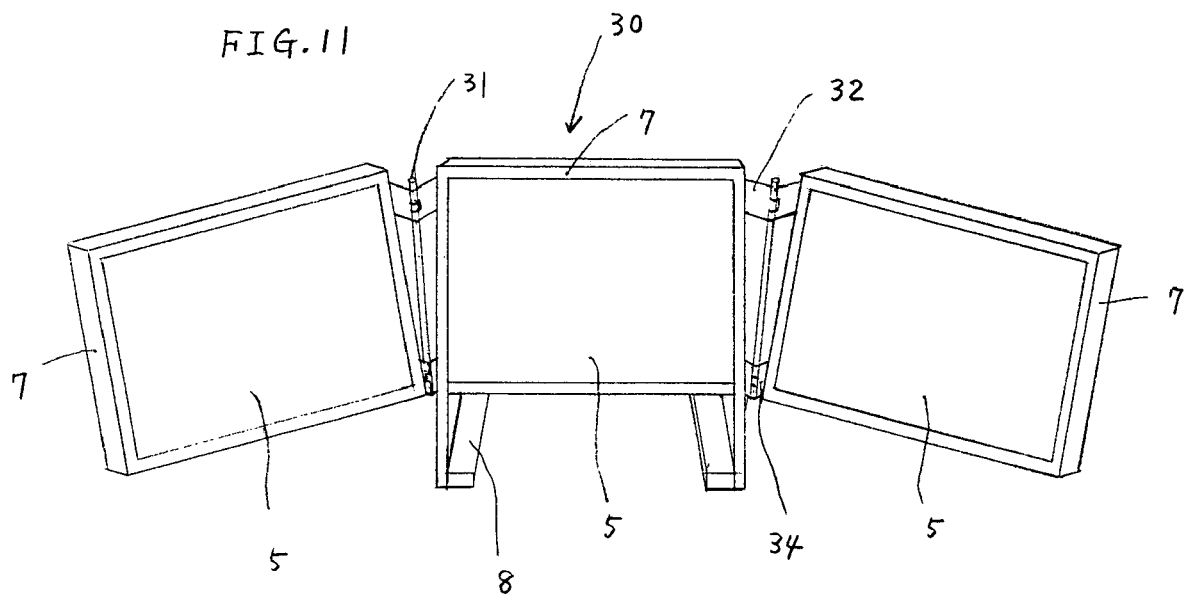
FIG. 11 is a schematic perspective view representing a sixth embodiment of a multi-display device according to the present invention, in which three basic displays are connected horizontally by using a connection mechanism including a hinge member having an inclination (angle) adjusting mechanism in a horizontal plane.

For example, in the state of FIG. 11, when both the nuts 24, 24 screwed with the screw shaft 23 are adjusted so as to approach to each other, the inclination angle θ becomes small, and accordingly, the display screens of the adjacent two basic displays 5, 5 approach to each other so as to constitute one flat surface. On the contrary, when both the nuts 24, 24 are adjusted to be separated from each other, the inclination angle θ becomes large, and accordingly, the display screens of the adjacent two basic displays 5, 5 constitute a large angle therebetween. In such adjustment of the inclination angle θ, the length of the collar 25 is of course changed in accordance with the required adjustment of the inclination.

Furthermore, in place of such collar 25, a coil spring expandable in the longitudinal direction of the screw shaft 23 or a collar made of an elastic material may be utilized. In addition, further two nuts 24, 24 may be added so as to be screw-engaged with the screw shaft 23 inside the connection halves 21a, 21b. In this example, these inside nuts 24, 24 act for fastening the connection halves 21a, 21b in combination with the outside nuts 24, 24 in place of the collar 25.

According to the fourth and fifth embodiments mentioned above, the inclination angle of the screens can be adjusted to a degree easily visible for the user.

Further, in the third to fifth embodiments, the inclination adjusting mechanism 18 may be additionally provided, and according to such additional location of the inclination adjusting mechanism 18, the display screens can be supported in the vertically inclined state.

FIGS. 11 to 15 represent the sixth embodiment of the present invention showing a multi-display device 30. This multi-display device 30 includes, as shown in FIG. 11, three basic displays (liquid crystal displays) 5, 5, 5 which are horizontally arranged. In this arrangement, right and left (i.e., lateral) basic displays 5, 5 are connected to the central basic display 5 to be pivotal or rotatable by a hinge member 32 and a specific hinge member 34, respectively.

That is, in FIG. 11, the central basic display 5 is arranged inside the outer frame 7 having the base end portions secured to the support stand 8, and the lateral basic displays 5, 5 are arranged to both side portions of the outer frame 7. Both the side surfaces of the outer frame 7 of the central basic display 5 and one side surface of the outer frame 7 of each of the lateral basic displays 5, 5 are connected by support shafts 31, 31 extending vertically and two hinge members 32, 34 vertically disposed to each of the support shafts 31, respectively.

Further, in the illustrated example, although the hinge members 32 and 34 are connected to the upper and lower end side portions of the side surfaces of the outer frames 7, the hinge members 32 and 34 may be connected to the other portions of the side surfaces (for example, to the central portion and lower end side portion of the side surface of the outer frame 7). Further, a plurality of, i.e., more than one, hinge members 32 and 34 may be utilized respectively. In the illustrated example, although the hinge members 32 and 34 are connected to the side surface of the outer frame 7, the hinge members may be utilized to directly connect adjacent image display section supporting frames 4 without utilizing the outer frame 7.

Figure 12:
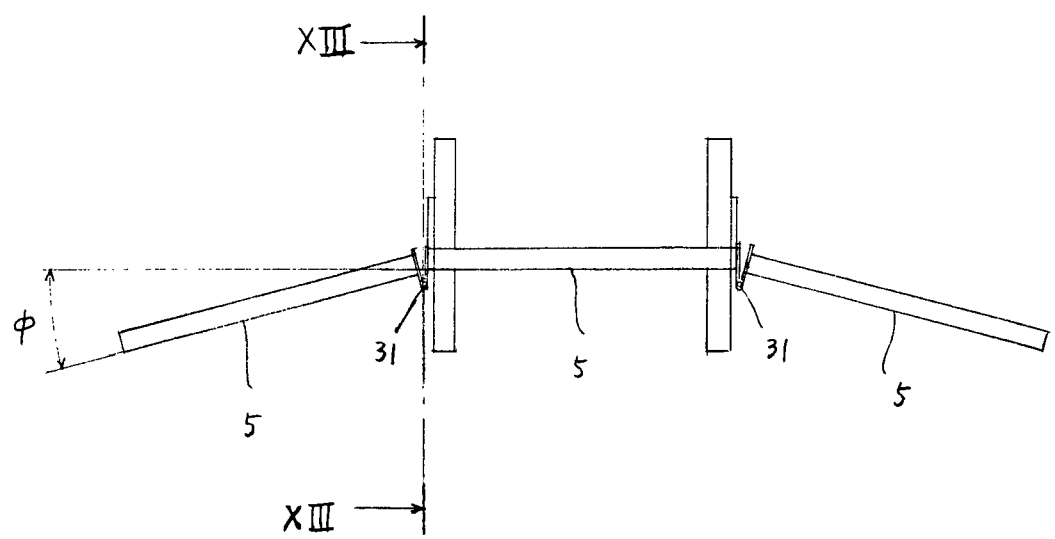
FIG. 12 is a plan view of the sixth embodiment mentioned above.
Figure 13:
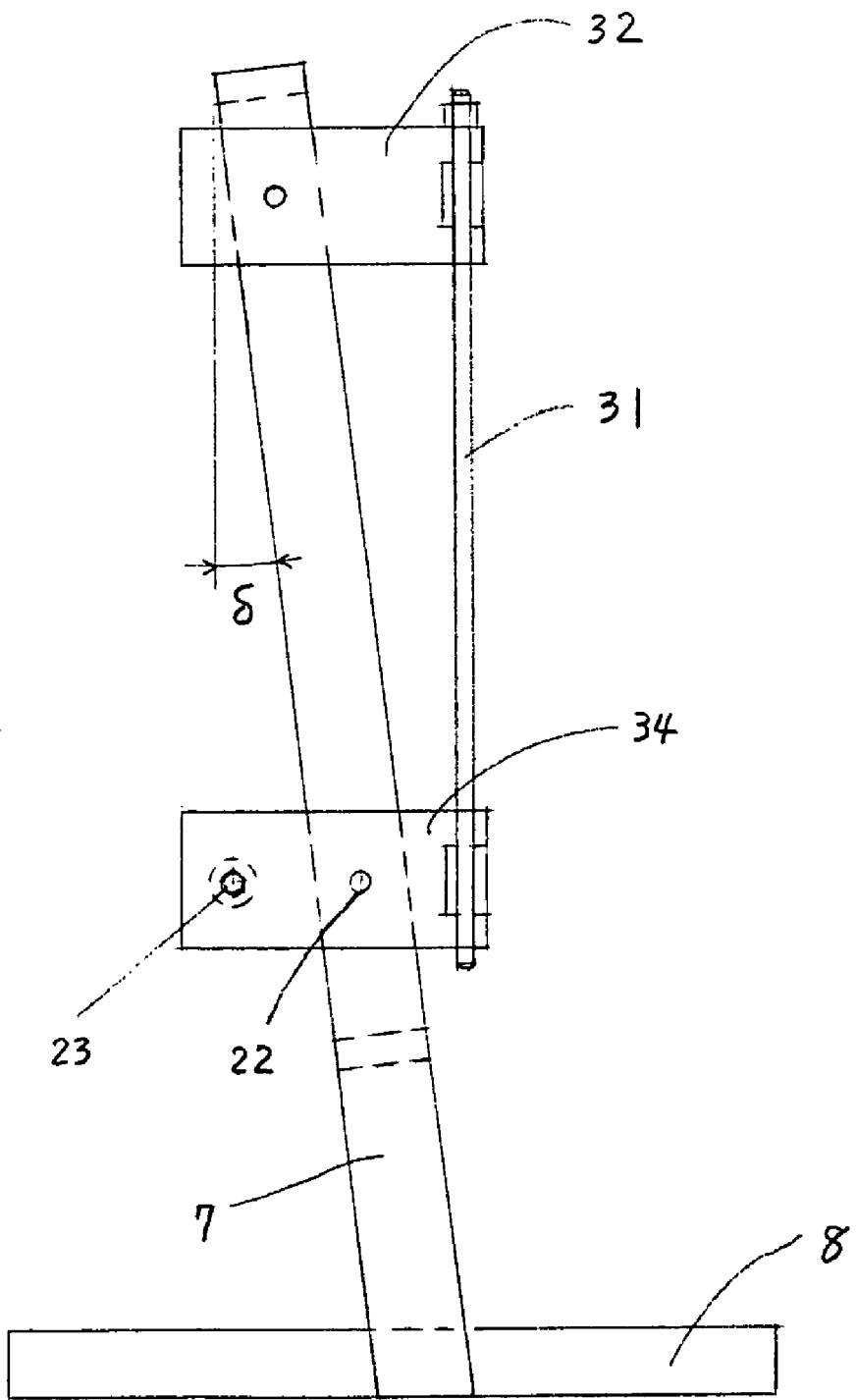
FIG. 13 is a sectional view taken along the line XIII-XIII in FIG. 12.
Figure 14:
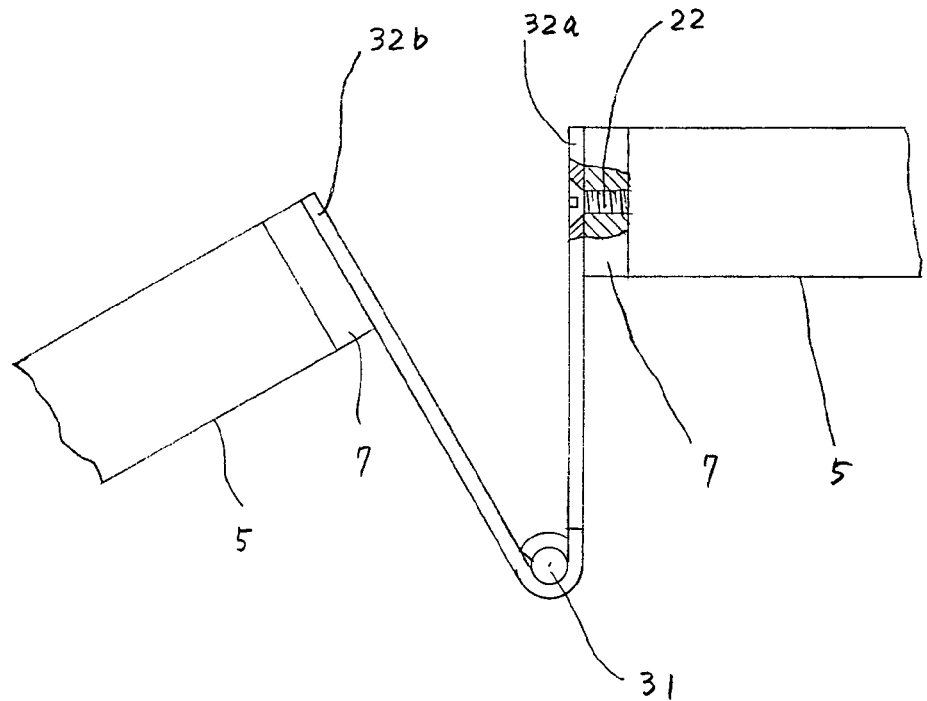
FIG. 14 is a plan view, partially broken away, showing a state in which side surface portions of the opposing outer frames of the adjacent basic displays in the sixth embodiment are connected at their upper sides by a connection member such as hinge member.

In the multi-display device 30 according to this embodiment, the central basic display 5 is vertically inclined at an angle of $\delta$, as shown in FIG. 13, so that the upper portion of the image screen is apart from the user for clear observation of the user. In addition, the lateral two basic displays 5, 5 are horizontally inclined at an angle of $\Phi$, as shown in FIG. 12, with respect to the central basic display 5 so that the lateral basic displays 5, 5 are positioned near the user in comparison with the central basic display 5. In such arrangement, the connection positions of the hinge members 32 and 34, provided to the support shaft 31 at its vertical positions, to the outer frames 7 and 7 are different from each other.

That is, the connection halves 32a, 32b of the hinge member 32 disposed to the upper portion of the support shaft 31 are connected, at their front end sides (upper sides as viewed in FIG. 14) to the side surface of the outer frame 7. On the other hand, the connection halves 34a, 34b of the hinge member 34 disposed to the lower portion of the support shaft 31 are connected, at their base end sides (lower sides as viewed in FIG. 15) to the side surface of the outer frame 7.

The adoption of such connection mode as mentioned above is based on the following reason. That is, in the arrangement of FIG. 13, the central basic display 5 is inclined at an angle of $\delta$, and accordingly, if there is adopted an arrangement, as in a usual case, in which the positions of the holes for the screws 22 of the respective connection halves 32a, 32b and 34a, 34b of upper and lower hinge members 32 and 34 (with reference to FIGS. 14 and 15), i.e., the distances from the support shaft 31 to these screws 22, are made equal to each other, the lower end portions of the left and right (lateral) basic displays 5, 5 are inclined, and hence, the display screens will become hard to be observed.

Then, in order to obviate such defect and achieve the easy and clear observation of the respective display screens, in the present invention, the positions of the holes for the screws 22 of the upper and lower hinge members 32 and 34 are made different (shifted) as mentioned above. According to such shifted arrangement, the distance between the adjacent basic displays 5, 5 at vertical upper position is different from one at a lower position.

Figure 15:
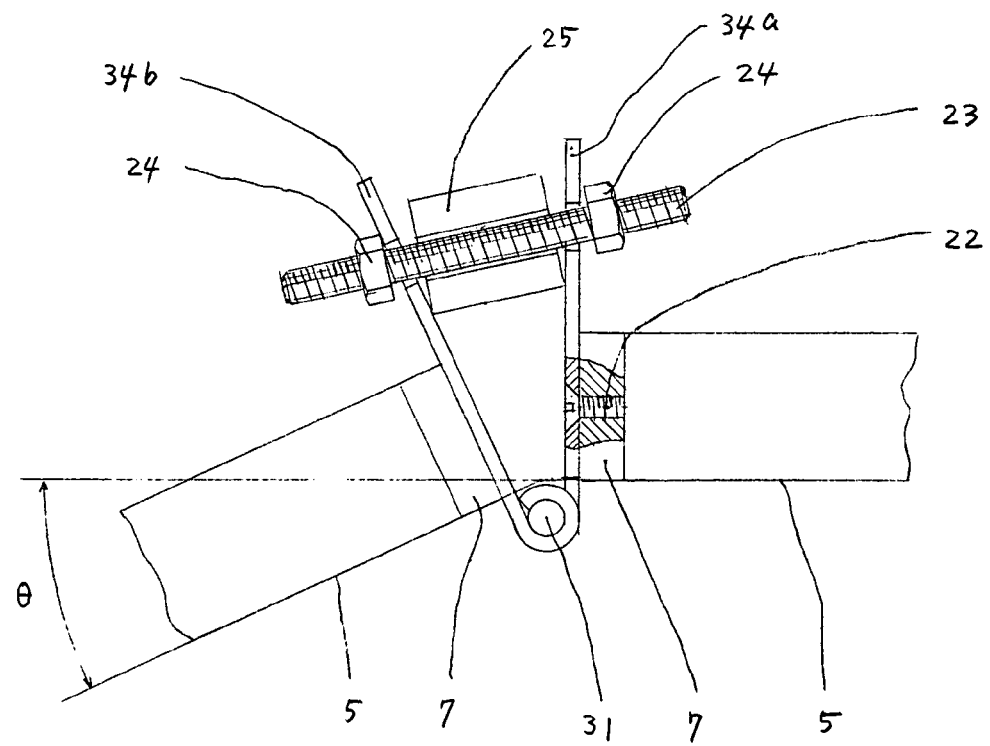
FIG. 15 is a plan view, partially broken away, showing a state in which side surface portions of the opposing outer frames of the adjacent basic displays in the sixth embodiment are connected at their lower sides by a connection member such as hinge member and also showing an inclination angle adjusting mechanism in the horizontal plane.

In this multi-display device 30, as shown in FIG. 15, the inclination angle adjusting mechanism 30 being the same as that in the fifth embodiment is utilized, and the display screen can be hence adjusted and held at the adjusted position at the inclination angle of $\Phi$ which is available for the user.

Figure 16:
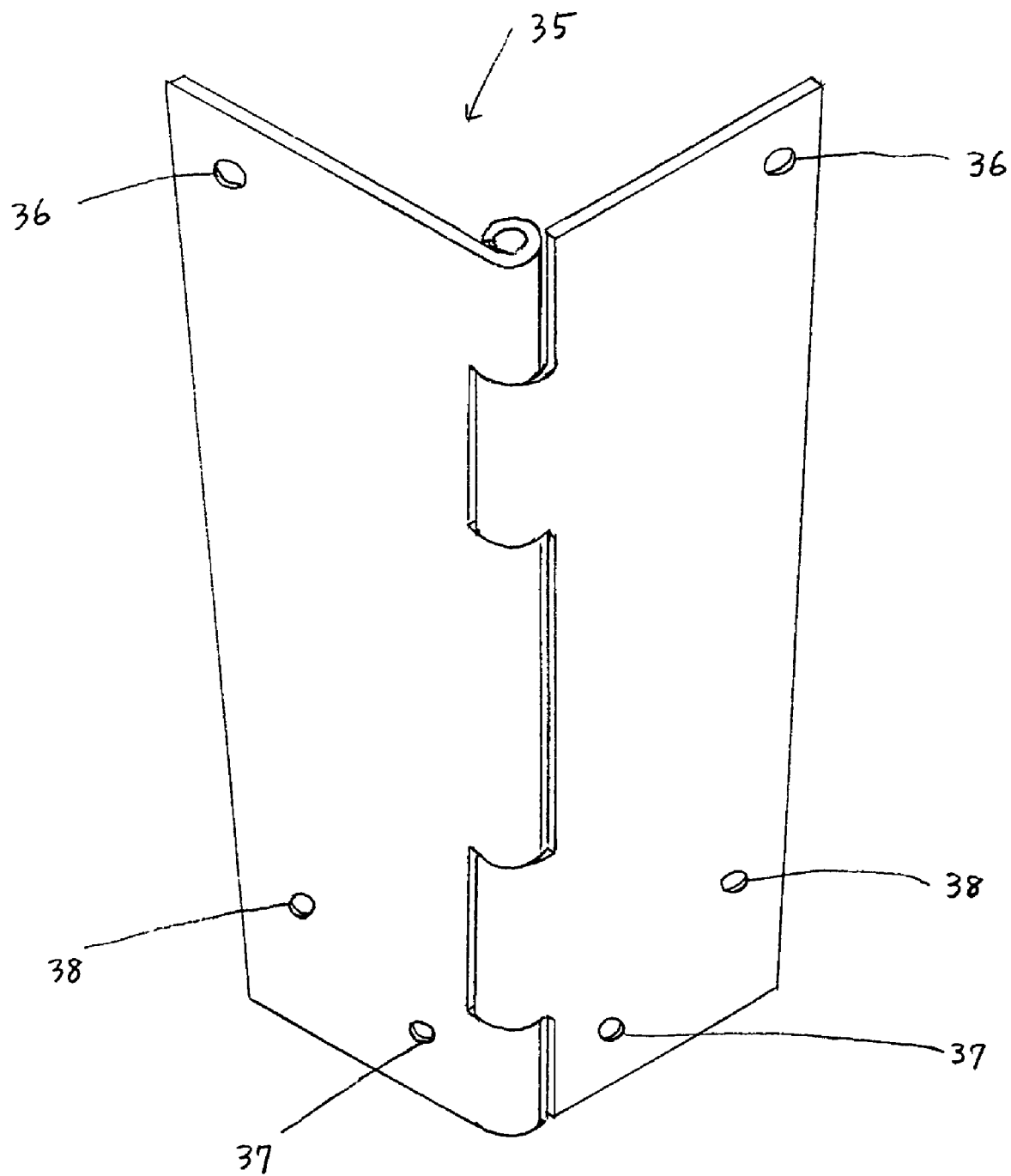
FIG. 16 is a perspective view showing a structure in which the upper side and the lower side of the connection member, such as hinge member, in the sixth embodiment are integrated, showing different coupling hole positions in the upper and lower sides.

Furthermore, FIG. 16 shows a modification of the sixth embodiment of the present invention, in which a integral type hinge member 35 is utilized, in which the afore-mentioned upper and lower hinge members 32 and 34 are integrated by substituting these two hinge members with a single hinge member. Referring to FIG. 16, reference numerals 36 and 37 are holes for upper and lower screws 22, and reference numeral 38 denotes a hole through which the screw shaft 23 penetrates. The use of such integral type hinge member 35 may advantageously close a gap between the adjacent basic displays 5, 5 shown in FIG. 11. In the structure of FIG. 11, since the upper and lower hinge members 32 and 34 are disposed apart from each other, the gap exist between them, which is not appear in this modified embodiment.

The multi-display device according to the present invention is electrically connected to a computer, not shown, so as to be operated, i.e., to display the desired images on the image screens of the respective basic displays 5.

For example, when it is required to connect this multi-display device 30 to the CAD or CAM device as mentioned hereinbefore, an image of mechanical assembly to be designed may be displayed on the central and right basic displays 5, 5 and a portion to be changed in design may be displayed on the left basic display 5 in an enlarged scale. In such case, the central and right basic displays may be inclined in the same plane by the inclination angle adjusting mechanism 20 to display the assembling diagram on the screens.

In this case, on the left basic display 5, list table of mechanical parts may be displayed in place of the enlarged part view. According to such use of the multi-display device of the present invention, the assembling diagram, the list table and so on can be simultaneously displayed on the image screens, thus improving the working efficiency. Moreover, since it is not necessary, as required in the prior art, to preliminarily print out the list table or the like, papers can be effectively utilized, thus being economical in source or energy.

In addition, when office work is executed by utilizing such multi-display device 30, one of these three basic displays 5, 5 may be utilized for document preparation by means of word processor software and the other two basic displays 5, 5 may be utilized for displaying a reference material or a list table. In another case where a TV tuner board is installed in a computer body, a desired TV program may be displayed on one basic display 5, while using other two basic displays 5, 5 for the office working.

Furthermore, through such operation using the multi-display sections of the multi-display device 30, the office working can be effectively done, and moreover, the device 30 can be also utilized in many fields and for many objects. In addition, in this multi-display device 30, since three basic displays 5-5, are supported only by the support stand 8 for the central basic display 5, the area contacting to the desk or the like on which the support stand 8 is placed can be minimized, thus being convenient and advantageous.

Figure 17:
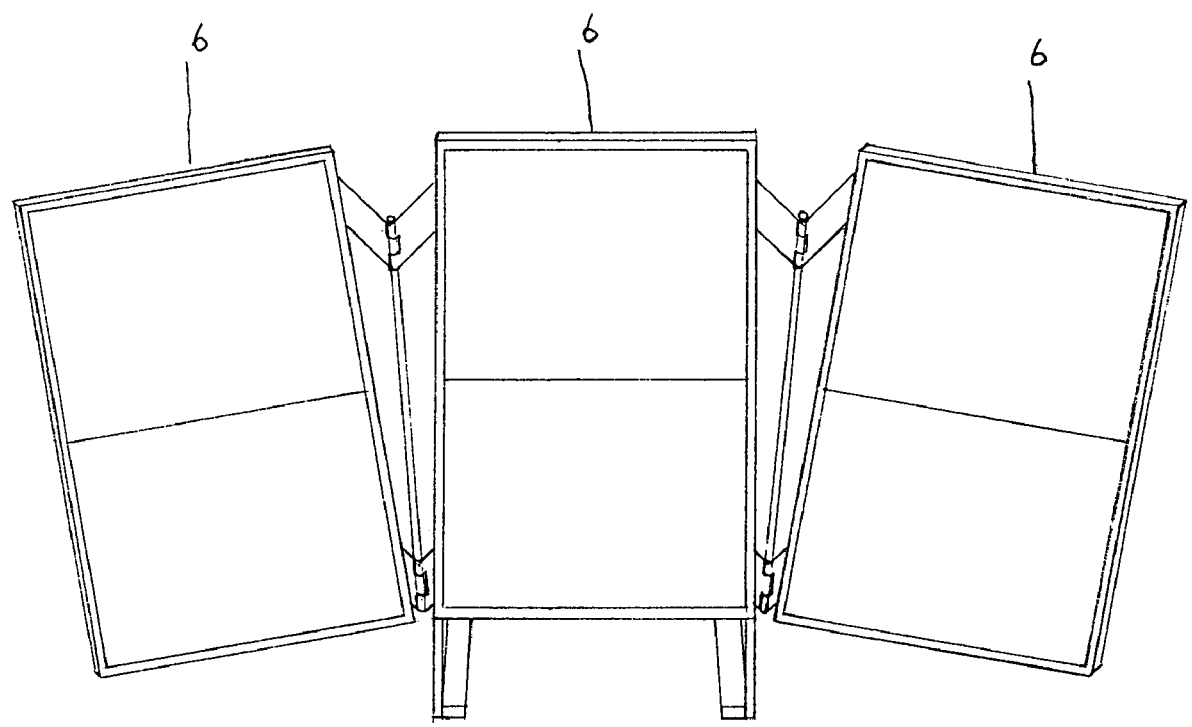
FIG. 17 is a front view of a seventh embodiment, showing a multi-display device including, in total, six screens, in which three basic displays are mounted vertically on the respective three horizontal basic displays of the sixth embodiment.

In the sixth embodiment mentioned above, the multi-display device includes one central basic display 5 and two lateral basic displays 5, 5. However, the seventh embodiment shown in FIG. 17, comprised one central basic unit 6 and two lateral basic units which are arranged on right and left side of the central basic unit 6, respectively. Each of the basic units 6, 6, 6 comprises two basic displays 5, 5 which are vertically arranged. That is, six basic displays 5-5 are arranged so as to provide six image display sections.

In the embodiments mentioned above, although the liquid display is utilized as basic display 5, a plasma display or an organic EL display may be utilized in place of such liquid display.

INDUSTRIAL APPLICABILITY

According to the multi-display device of the present invention, even in the case of a large image to be displayed, a plurality of images can be displayed as well as the large image can be entirely displayed. In addition, by utilizing no mechanism for rotating, by 90 degrees, the display section and any specific software therefor, a vertically long or horizontally long image can be displayed, and the multi-display device can be preferably utilized as a display device for a computer usable in various ways and usages including one for game as well as ones for CAD, CAM device or device for office work.

The invention claimed is:

1. A multi-display device, wherein a plurality of basic displays or basic units are horizontally arranged, a central basic display or central basic unit is supported and held in an inclined state by an inclination mechanism, lateral basic displays or lateral basic units are connected to and supported on the central basic display or central basic unit respectively by hinge members so that a distance between upper portions of adjacent central and lateral basic displays or basic units is different from a distance between lower portions of the adjacent central and lateral basic displays or basic units, each of the hinge members includes a vertical king-pin having a plurality of leaves at an upper side portion thereof for connection to said upper portions of adjacent central and lateral basic displays or basic units and plurality of leaves at a lower side portion thereof for connection to said lower portions of adjacent central and lateral basic displays or basic units; and wherein a distance between said connection position of a respective one of said leaf of the hinge member to the basic display or basic unit and a center of said vertical king-pin at said upper side portion of the hinge member is different from a distance between said connection position of a respective one of said leaf of the hinge member to the basic display or basic unit and a center of said vertical king-pin at said lower side portion thereof, and the king-pin is free and spaced from the basic displays or basic units.

2. A multi-display device according to claim 1, wherein, in the connection using the hinge member, an upper side connection portion and a lower side connection portion are integrated in one hinge member.

\* \* \* \* \*